US00RE41367E

(19) United States
(12) Reissued Patent
Studebaker

(10) Patent Number: US RE41,367 E
(45) Date of Reissued Patent: Jun. 8, 2010

(54) SPRAYLESS SURFACE CLEANER

(75) Inventor: Roy Studebaker, Centralia, WA (US)

(73) Assignee: Hydramaster North America, Inc., Plymouth, MN (US)

(21) Appl. No.: 11/484,031
(22) Filed: Jul. 10, 2006

Related U.S. Patent Documents

Reissue of:
(64) Patent No.: 6,243,914
Issued: Jun. 12, 2001
Appl. No.: 09/366,941
Filed: Aug. 4, 1999

(51) Int. Cl.
*B08B 5/04* (2006.01)
*A47L 11/30* (2006.01)

(52) U.S. Cl. ..... 134/21; 15/320; 15/322
(58) Field of Classification Search ..... 134/21, 134/10, 34; 15/320, 321, 322, 345, 346
See application file for complete search history.

(56) References Cited

U.S. PATENT DOCUMENTS

| | | | | | |
|---|---|---|---|---|---|
| 695,162 | A | | 3/1902 | Lotz | 15/345 |
| 791,567 | A | | 6/1905 | Moorhead | 15/345 |
| 862,695 | A | | 8/1907 | Baldwin | 15/345 |
| 1,654,727 | A | | 1/1928 | Green et al. | 15/345 |
| 3,720,977 | A | | 3/1973 | Brycki | 15/321 |
| 4,075,733 | A | | 2/1978 | Parise et al. | 15/322 |
| 4,083,077 | A | | 4/1978 | Knight et al. | 15/321 |
| 4,095,309 | A | | 6/1978 | Sundheim | 15/320 |
| 4,137,600 | A | * | 2/1979 | Albishausen | |
| 4,270,238 | A | | 6/1981 | Shallenberg et al. | 15/321 |
| 4,282,626 | A | | 8/1981 | Schneider | 15/320 |
| 4,335,486 | A | | 6/1982 | Kochte | 15/321 |
| 4,392,270 | A | | 7/1983 | Magee | 15/322 |
| 4,407,041 | A | | 10/1983 | Goldsmith | 15/321 |
| 4,488,330 | A | | 12/1984 | Grave | 15/322 |
| 4,521,935 | A | | 6/1985 | Johnston et al. | 15/322 |
| 4,649,594 | A | * | 3/1987 | Grave | 15/322 |
| 4,654,925 | A | | 4/1987 | Grave | 15/322 |
| 4,720,889 | A | | 1/1988 | Grave | 15/322 |
| 4,879,784 | A | | 11/1989 | Shero | 15/322 |
| 5,157,805 | A | * | 10/1992 | Pinter | 15/322 |
| 5,485,651 | A | | 1/1996 | Payeur | 15/321 |
| 5,485,652 | A | | 1/1996 | Holland | 15/322 |
| 5,555,598 | A | | 9/1996 | Grave et al. | 15/322 |
| 5,632,670 | A | | 5/1997 | Gwyther | 452/74 |
| 5,815,869 | A | | 10/1998 | Hopkins | 8/158 |

FOREIGN PATENT DOCUMENTS

DE 2820568 11/1978

OTHER PUBLICATIONS 112 pages prosecution history of parent reissue U.S. Appl. No. 10/459,325, filed Jun. 10, 2003, of which the present reissue application is a Divisional.

* cited by examiner

*Primary Examiner*—Michael Barr
*Assistant Examiner*—Saeed T Chaudhry
(74) *Attorney, Agent, or Firm*—Oppenheimer Wolff & Donnelly LLP

(57) ABSTRACT

A [cleaning head for carpets, walls or upholstery, including a rigid, exterior, open-bottomed main body which defines the surface subjected to the cleaning process. Mounted within or adjacent to the main body portion coplanar with the bottom thereof is the fluid-applying device, which includes a slot at an acute angle to the plane of the bottom of the body located adjacent the plane of the bottom of the body, configured such that the fluid is applied in a thin sheet which flows out of the slot and into the upper portion of the surface to be cleaned and subsequently into the vacuum source for recovery] *method for cleaning a surface comprises providing a cleaning tool including a lower surface contact area defined by a lip surrounding an opening through which a vacuum is applied and a liquid supply means adjacent the lip, placing the lower surface contact area in contact with a surface to be cleaned, applying a cleaning liquid to the surface to be cleaned within the lower surface contact area by flowing a substantially continuous film of cleaning liquid from an angled delivery slot of the liquid supply means over a portion of the lower surface contact area, and suctioning the film of cleaning liquid through the opening in the cleaning tool.*

10 Claims, 4 Drawing Sheets

FIG. 6
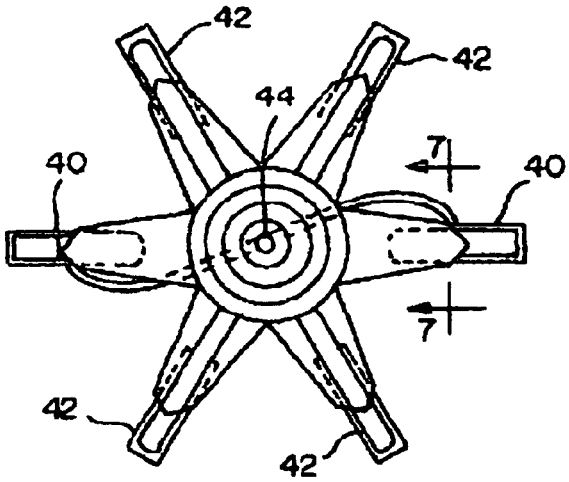
FIG. 7
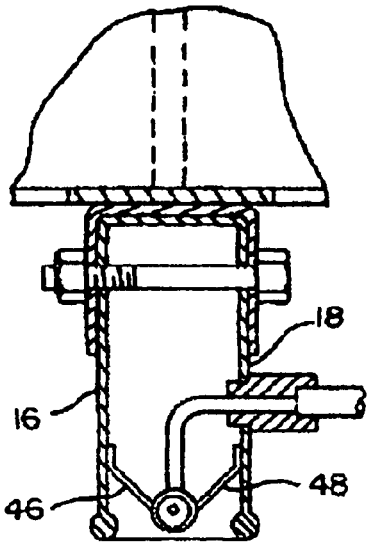
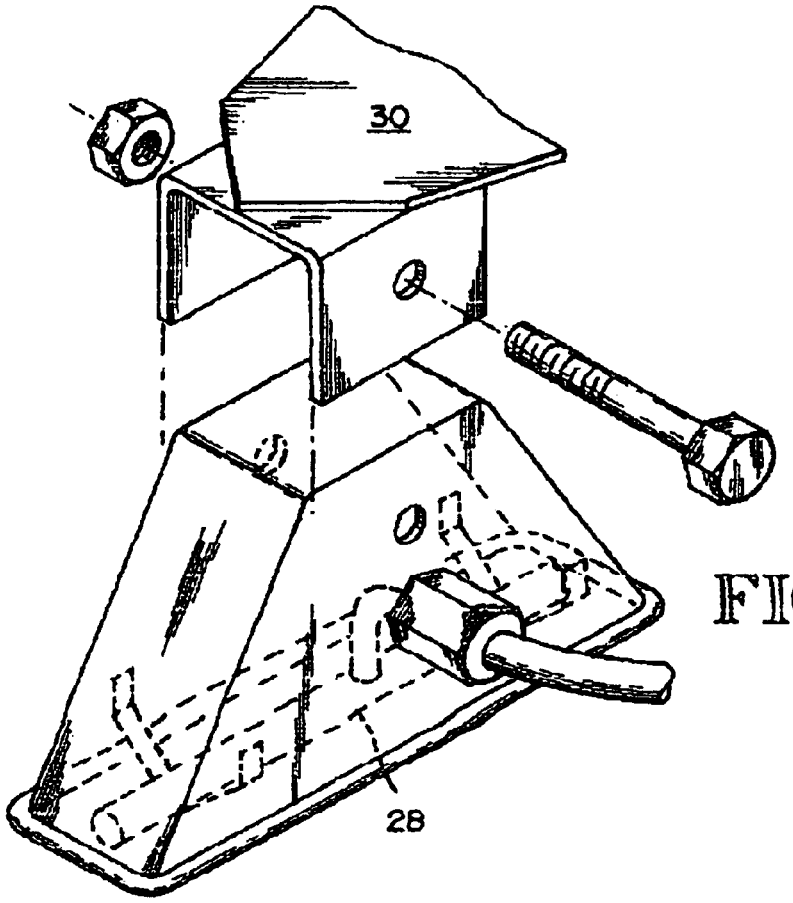
FIG. 8

SPRAYLESS SURFACE CLEANER

Matter enclosed in heavy brackets [ ] appears in the original patent but forms no part of this reissue specification; matter printed in italics indicates the additions made by reissue.

*Notice: More than one reissue application has been filed for the reissue of patent U.S. Pat. No. 6,243,914. The reissue applications are the instant application and application Ser. No. 10/459,325 filed Jun. 10, 2003, which is incorporated herein by reference.*

TECHNICAL FIELD

This invention relates to a tool for cleaning surfaces, and more particularly, to a tool for cleaning flooring surfaces, wall surfaces and upholstery. The tools utilize a cleaning fluid but do not include spray nozzles and therefore eliminate the problems associated therewith. The invention also relates to a method of delivering cleaning fluid to any one of a number of different tools. The cleaning fluid flows to the surface to be cleaned by traveling along the edge of the tool in a thin sheet, maintaining higher temperatures and allowing more complete recovery of the fluid and a reduced drying time.

BACKGROUND OF THE INVENTION

Since the first installation of carpeting and upholstery, there have been innumerable ways and theories as to the best approach for keeping the carpeting and other fabric material clean, including wet versus dry cleaning, deep versus shallow cleaning, and invariably an equal number of instruments or tools to effect the cleaning process. The most commonly used cleaning method today is the process of applying cleaning fluid as a spray under pressure to the surface to both dissolve the dirt and stains and to scrub the fibers and simultaneously apply a vacuum or negative pressure to extract the cleaning fluid and the soil captured thereby. Although this relatively high pressure method is the method most commonly used, it has some disadvantages. First, it must be remembered that the very nature of the soiled surface defines that the majority of the soil will be at or near the surface of the fibers and, therefore, a high pressure cleaning tends to drive some of the surface soil and cleaning fluid deeper, thereby requiring a very powerful vacuum system to extract those particles which have been driven beneath the outermost surface. Further, the use of cleaning fluid under pressure, applied through conventional jets, likewise drives the fluid itself deeper, and the fluid that is not immediately removed by the vacuum source takes a significantly longer amount of time to dry. Again, an inconvenience; but further, if the carpeting is used prior to the time it is completely dry, it is more likely to become soiled. Further, the sprayed fluid is atomized and comes into contact with the air, causing significant heat loss, diminishing the cleaning power of the fluid.

Numerous different approaches to spraying cleaning fluid under pressure and then removing it with a vacuum are illustrated in the prior art supplied herewith but will not be discussed in detail.

Another approach to the cleaning of carpeting and upholstery has been the use of a rotating device wherein the entire machine is transported over the carpeting while the cleaning head is rotated about a vertical axis. Typically, these machines include a plurality of arms, each of which includes one or more spray nozzles or a vacuum source providing a more intense scrubbing action since, in general, more scrubbing surfaces contact the carpet. These devices are primarily illustrated in the patents granted to Monson, and again, these devices are listed in the prior art known to the inventor but not discussed in detail herewith.

A third body of material wherein the cleaning fluid is either attempted to be deflected or otherwise controlled is illustrated hereinbelow.

U.S. Pat. No. 4,137,600, granted to Albishausen on Feb. 6, 1970, discloses a cleaning apparatus wherein the cleaning fluid is changed into a liquid curtain by a baffle within the cleaning head.

U.S. Pat. No. 4,335,486, granted to Kochte on Jan. 22, 1982, discloses a surface cleaning machine wherein the cleaning fluid is deposited upon the surface of the carpet pile from a wick like device which is wetted with the cleaning fluid.

U.S. Pat. No. 4,649,594, granted to Grave on Mar. 17, 1987, discloses a cleaning head wherein the cleaning solution is sprayed through a narrow passage and some is wicked along the surface of the passage.

U.S. Pat. No. 5,157,805, granted to Pinter on Oct. 27, 1992, discloses a method and apparatus for cleaning a carpet wherein the cleaning fluid is sprayed by nozzle against the back of a striker plate and then flows downwardly and through the carpet to a pickup vacuum.

U.S. Pat. No. 5,561,884, granted to Nijland et al on Oct. 8, 1996, discloses a suction attachment spray member wherein the fluid is sprayed against the distributor plate, which creates a planar diverging liquid jet substantially filling the vacuum chamber.

DISCLOSURE OF THE INVENTION

The present invention in its broadest sense deals with the distribution of fluid to a surface for cleaning purposes. The fluid is distributed through a slot in a manifold which is in contact with the surface and the slot is effectively at an angle to the surface to be cleaned. The fluid is delivered in a thin film which because of fluidic attraction follows the contour of the edge of the slot, passing through the upper surface of the carpet or fiber being cleaned without having been formed into discrete particles as with spraying, thus maintaining a hotter liquid, and also allowing a more complete pickup and/or recycle of the fluid, since a greater portion moves directly to the vacuum return, reducing the amount of fluid left on the surface because of a lesser penetration, and thus reducing the subsequent drying time.

In addition to the above advantages, the current invention essentially eliminates the problem of overspray when the cleaning head is not immediately adjacent the surface to be cleaned.

With the above-noted prior art and objects in mind, it is an object of the present invention to provide a cleaning nozzle wherein the cleaning fluid is moved as a sheet along the edge of the nozzle and distributed as a film through the upper portion of the material to be cleaned and is immediately removed along with the grime.

Another object of the present invention is to provide a cleaning bar which is moved over the upper surface of the material to be cleaned, the bar dispenses a cleaning fluid which penetrates the upper portion of the material dissolving the soil, which is then immediately vacuumed away, leaving a clean and substantially dry surface.

Still another object of the present invention is to provide a distribution manifold for cleaning fluid including a lower distribution surface and a distribution slot at an angle to the surface to be cleaned, allowing the fluid to flow over the edge of the slot and into the upper portion of the surface to be cleaned in a film.

Still a further object of the present invention is to provide a cleaning method wherein the cleaning fluid is distributed through a tubular member which is moved laterally across the surface to be cleaned, said tubular member having a longitudinal slot at an obtuse angle to the radius, allowing the fluid to be distributed as a film along the surface outside the slot and the surface to be cleaned.

Yet another object of the present invention is to provide a cleaning system having a cleaning fluid-applying device which substantially reduces the amount of fluid left on the cleaned surface while also substantially eliminating the problem of overspray.

Still a further object of the present invention is to delivery fluid to an adjacent surface in a thin, continuous film, controlling the amount of fluid and depth of penetration of the fluid.

BRIEF DESCRIPTION OF THE DRAWINGS

FIG. 6 is a top plan view of a rotary cleaner which could incorporate the present invention.

FIG. 7 is a vertical section through one of the cleaning heads in the device of FIG. 6.

FIG. 8 is an isometric representation of the cleaning head of FIGS. 6 and 7 further disclosing the present invention in its working environment.

BEST MODE FOR CARRYING OUT THE INVENTION

Figure 1:
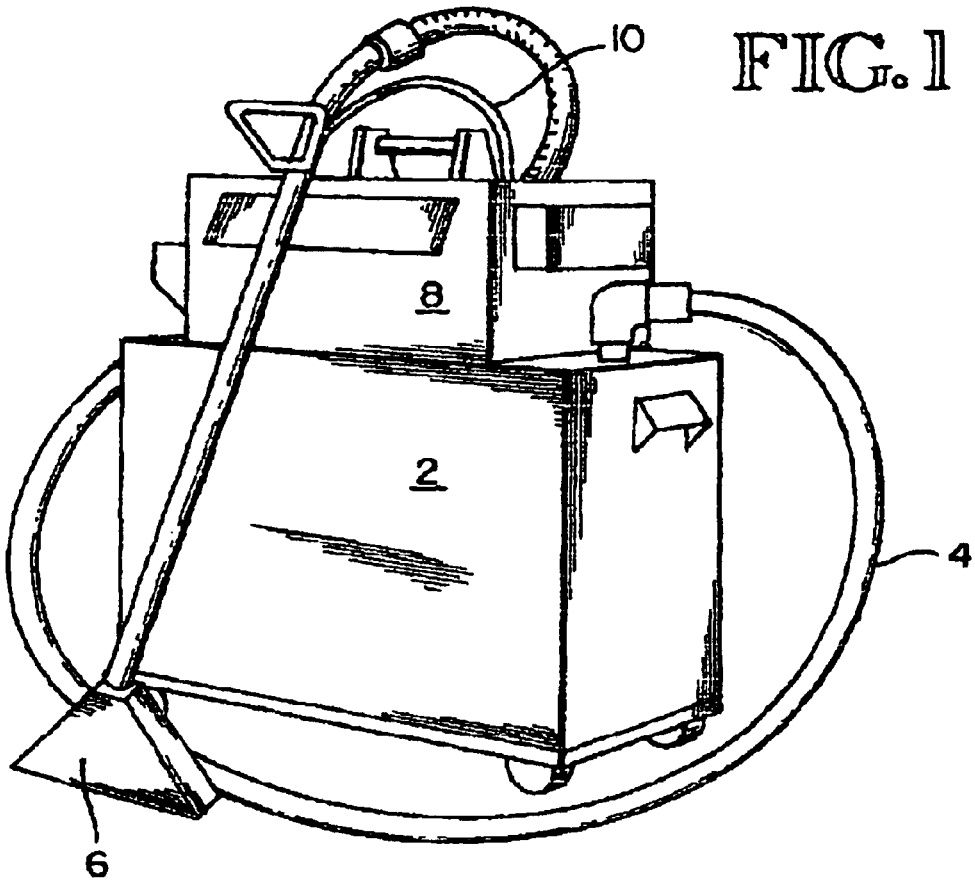
FIG. 1 is an environmental view showing a self-contained carpet cleaning apparatus, which is one type that could utilize the present invention.

As seen in FIG. 1, the cleaning system for the present invention includes a main receptacle 2 into which the soiled fluid is returned via vacuum hose 4 interconnected with nozzle 6. Mounted above the receptacle 2 is the vacuum motor and the supply of a cleaning material supplied via tube 10. It is to be understood that this cleaning system could be track-mounted.

Figure 2:
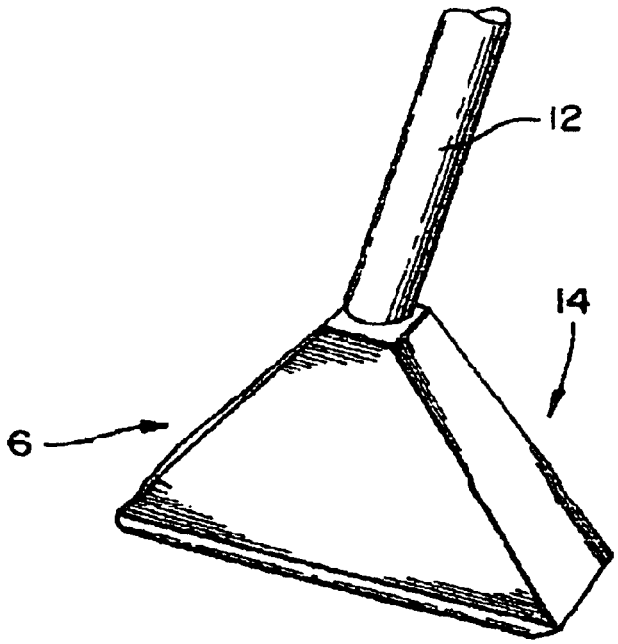
FIG. 2 is an isometric view of the cleaning head for the machine shown in FIG. 1.
Figure 3:
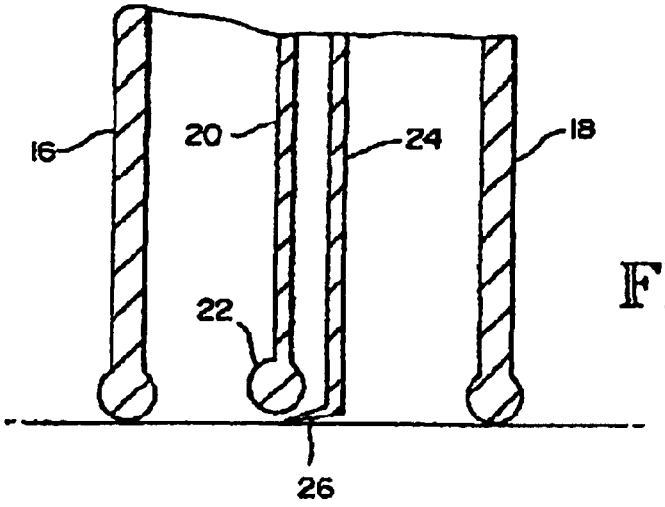
FIG. 3 is a sectional view through the lower portion of a cleaning head showing one version of the present invention.

As better seen in FIG. 2, the carpet cleaning head 6 includes a rigid vacuum tube 12 and a rectangular, downwardly open truncated pyramidal envelope 14 which would contain the spray which is generally applied in prior known cleaning methods as well as forming the plenum for the vacuum returning the soiled liquid to the source.

As best shown in FIGS. 3, 4, 9 and 10 which are four separate embodiments, are the improved means for applying the cleaning fluid without the inherent problems of spray escaping. The front and back of the cleaning head are depicted as 16 and 18, which with the end panels (not shown) define a rectangular lip which defines the lower surface contact area of the floor to be cleaned, which is momentarily subjected to the cleaning environment. Securely mounted (see FIG. 3) to the interior of the cleaning head is a downwardly open fluid supply means having a first wall 20 terminating in a head 22 and a second wall 24 terminating in an inwardly turned foot 26. The cleaning fluid which is supplied in a steady stream downwardly between the walls 20 and 24 flows outwardly in a sheet pass foot 26 and around head 22 to be applied uniformly to the carpet or outer material, and then vacuumed up to the return tank. The utilization of a sheet of fluid which flows down the nozzle head eliminates the cooling of the fluid caused by transforming it from a solid into droplets, reduces the amount of fluid being used for a particular job, and further eliminates the problem of overspray should the cleaning head be inadvertently moved from the surface or tilted so one edge is raised.

Figure 4:
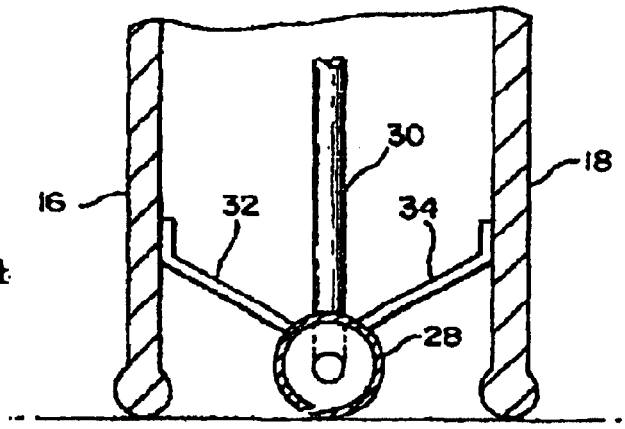
FIG. 4 is a vertical section of the lower portion of a cleaning head showing another embodiment of the present invention.

A second embodiment of the present invention is shown in FIG. 4, wherein walls 16 and 18 can again be seen, terminating adjacent the floor surface to be cleaned. Mounted between the two walls is a horizontal tube 28 having an angled slot 29 supplied by conduit 30 and mounted by means of brackets 32, 34 within the cleaning head.

Figure 5:
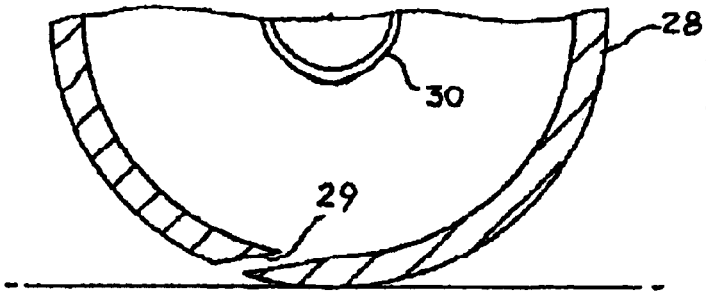
FIG. 5 is an enlarged cross-section through the fluid-applying element of the present invention as shown in FIG. 4.

Reference is now had to FIG. 5, wherein the tube or manifold 28 is enlarged to show the slit or groove 29, which is at an acute angle to the supporting floor or at an obtuse angle to the radius taken at the point of intersection with the circular cross-section. It is important to know at this point that the width of the slit 29 and the angle to the floor are critical elements in the proper functioning of the present invention and the appropriate application of the cleaning fluid.

As seen in FIG. 6, the present invention could be used in an alternate embodiment such as that taught by Monson in U.S. Pat. No. 4,441,229, wherein cleaning and vacuum heads 40 and 42 are mounted to a plurality of arms which are rotated about a hub 44.

Referring now to FIG. 7, which is a vertical section through the cleaning head 40, it can be seen that the supply conduit 28 is securely mounted between the walls 16 and 18 by brackets 46, 48 and in contact with the floor surface or uniplanar with the bottom edges of the walls 16, 18.

Although the embodiment shown in FIGS. 6–8 depicts six arms, two of which dispense fluid, it is to be understood that other combinations could easily be used.

Figure 9:
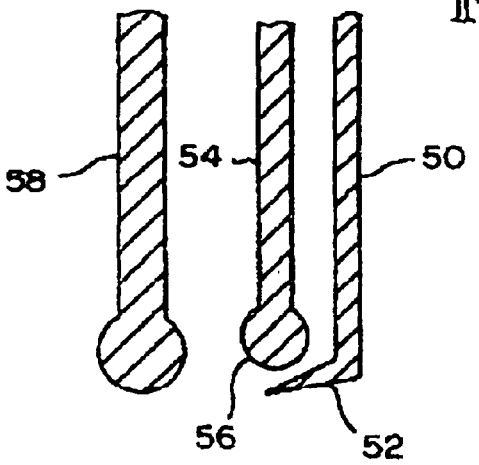
FIG. 9 is an alternate embodiment wherein the fluid delivery is adjacent the vacuum.
Figure 10:
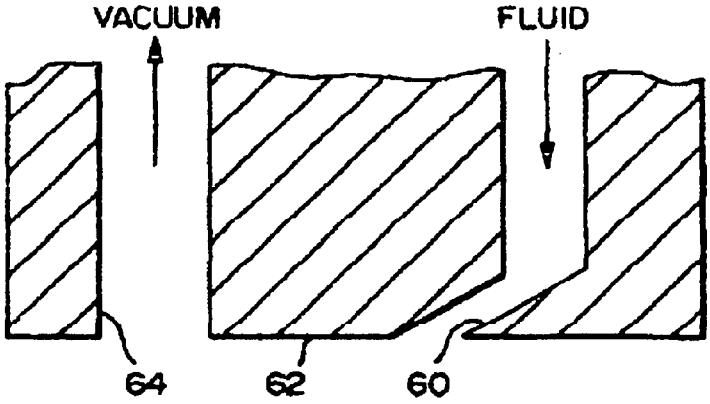
FIG. 10 is yet another embodiment with the fluid delivery adjacent the vacuum.

As seen in FIGS. 9 and 10, the fluid supply, since it is not sprayed, need not be contained in an envelope. In FIG. 9, fluid flows downwardly between wall 50 which terminates in foot 52 and wall 54 which terminates in head 56, and forms a sheet flowing over head 56. The fluid is returned by vacuum between walls 54 and 58. The head shown in FIG. 10 is of one piece, with the fluid exiting through angular slot 60, flowing along bottom surface 62, and being removed through vacuum opening 64.

Thus, as can be seen, the present invention provides a way to safely and efficiently clean carpeting and the like while reducing the heat loss of cleaning fluid used for a particular job, avoiding the problem of overspray, and, perhaps most importantly, to allow the carpet to be dried more quickly, since there is less penetration and therefore more fluid is extracted. It is further to be noted that the fact that fluid is not sprayed upon the carpet prevents it from driving the soil further into the nap.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

[1. A cleaning head including a main body portion adapted to be used with a source of cleaning liquid, and a vacuum source for cleaning a floor, wall or upholstered surface; comprising:

a lower surface contact area defined by a rectangular lip defined by the main body of the head, outlining the limits of operation of the tool as it is guided over the floor;

liquid-applying means fixedly located within the confines of the lip, said liquid-applying means being configured such that the cleaning liquid is applied to the surface as a continuous film flowing over the lower surface, whereby the liquid is better controlled, there is no danger of overspray, and the surface is dried more quickly;

means to interconnect the cleaning head and a source of cleaning liquid; and means to interconnect the cleaning head and a vacuum source.]

[2. A floor, wall or upholstery cleaning tool for use in conjunction with a source of cleaning liquid and a vacuum source comprising:

means interconnecting the tool of the liquid source;

exterior envelope means and interior supply means wherein the exterior envelope has a substantially uniplaner lower surface wherein the envelope means defines a substantially enclosed area of the floor when in contact therewith and is connected to the vacuum source and the supply means is interconnected with the source of cleaning liquid, said interior supply means provides an elongated bottom lip substantially uniplaner with the lower surface of the envelope means and is configured such that the liquid is selectively applied to the floor as a thin film which flows over the bottom lip.]

[3. A tool as in claim 2, wherein the supply means is tabular and includes an elongated slot in its lower surface for delivering the cleaning liquid.]

[4. A tool as in claim 3, wherein the slot is at an acute angle to the plane formed by the lower surface of the exterior envelope means so as to create a fluid attraction, moving fluid toward the vacuum source.]

[5. A tool as in claim 2, wherein the supply means comprises a downwardly open narrow slot with its lower opening substantially in the same plane as the bottom surface of the envelope, means one side of which includes an inwardly projecting foot.]

[6. A cleaning head adapted to be used with a source of cleaning liquid and a vacuum source for cleaning a floor, wall or upholstered surface, comprising:

a lower surface contact area defined by a lip surrounding an opening through which a vacuum is applied for removing fluid and entrained soil; and a liquid supply means adjacent the lip, including an angled delivery slot, causing the liquid to flow in a sheet over the lip and into the vacuum.]

*7. A method for cleaning a surface, the method comprising:*

*providing a cleaning tool comprising:*

*a lower surface contact area defined by a lip surrounding an opening through which a vacuum is applied for removing liquid; and*

*a liquid supply means adjacent the lip, the liquid supply means including an angled delivery slot structured for causing liquid to flow over the lip and into the opening through which the vacuum is applied;*

*placing the lower surface contact area in contact with a surface to be cleaned;*

*applying a cleaning liquid to the surface to be cleaned within the lower surface contact area by flowing a substantially continuous film of cleaning liquid from the angled delivery slot over a portion of the lower surface contact area; and*

*suctioning the film of cleaning liquid through the opening in the cleaning tool.*

*8. The method of claim 7 wherein placing a lower surface contact area in contact with a surface to be cleaned further comprises placing a lowermost surface of the cleaning tool in contact with a surface to be cleaned.*

*9. The method of claim 8 wherein placing a lower surface contact area in contact with a surface to be cleaned further comprises placing the lip of the cleaning tool in contact with a surface to be cleaned.*

*10. The method of claim 8 wherein flowing a substantially continuous film of cleaning liquid from the angled delivery slot over a portion of the lower surface contact area further comprises flowing the film of cleaning liquid over the lowermost surface.*

*11. The method of claim 8 wherein placing a lower surface contact area in contact with a surface to be cleaned further comprises outlining limits of operation of the cleaning tool.*

*12. The method of claim 8, further comprising: interconnecting the cleaning tool and a source of cleaning liquid.*

*13. The method of claim 12, further comprising: interconnecting the cleaning tool and a source of vacuum.*

*14. The method of claim 7, wherein the lip surrounding the opening in the lower surface contact area is a substantially rectangular lip.*

*15. A method for cleaning a surface, the method comprising:*

*providing a cleaning device defining a first chamber coupled to a vacuum source and having a substantially planar opening, and a second chamber coupled to a cleaning liquid source and having an angled distribution slot and a distribution surface adjacent to the substantially planar opening;*

*positioning the distribution surface adjacent to a surface to be cleaned such that the distribution surface is substantially parallel to the surface to be cleaned; and*

*distributing a substantially continuous film of cleaning liquid through the angled distribution slot and across a portion of the distribution surface positioned substantially parallel to the surface to be cleaned such that the substantially continuous film of cleaning liquid flows from the second chamber, along the distribution surface, and into the first chamber.*

*16. A method for cleaning a surface, the method comprising:*

*providing a cleaning head defining a first chamber structured for connection to a source of vacuum and having a substantially planar opening, and a second chamber structured for connection to a source of cleaning liquid and having an angled distribution slot and a distribution surface, the angled distribution slot being positioned adjacent to the planar opening of the first chamber;*

*placing a surface contact area of the cleaning head in contact with a surface to be cleaned such that the dis-*

*tribution surface is substantially parallel to the surface to be cleaned;*

*applying a cleaning liquid to the surface to be cleaned within the surface contact area by flowing a substantially continuous film of cleaning liquid through the angled distribution slot and over a portion of the distribution surface positioned substantially parallel to the surface to be cleaned; and*

*removing the film of cleaning liquid through the first chamber.*

* * * * *